United States Patent [19]

Wright

[11] Patent Number: 4,615,804
[45] Date of Patent: Oct. 7, 1986

[54] HIGH DENSITY PLEAT SPACING AND SCORING TOOL AND FILTER MADE THEREWITH

[75] Inventor: Mervin E. Wright, Apple Valley, Minn.

[73] Assignee: Donaldson Company, Inc., Minneapolis, Minn.

[21] Appl. No.: 646,705

[22] Filed: Aug. 30, 1984

[51] Int. Cl.$^4$ .............................................. B01D 27/06
[52] U.S. Cl. ............................... 210/493.1; 210/493.5; 55/500; 55/521; 493/404; 493/941
[58] Field of Search ............................... 210/493.1–493.5; 55/497, 498, 500, 521, DIG. 5, 475, 524; 162/196, 223; 493/397, 404, 941

[56] References Cited

U.S. PATENT DOCUMENTS

| | | | |
|---|---|---|---|
| 2,298,980 | 10/1942 | Sloan et al. | 210/486 |
| 2,395,449 | 2/1946 | Briggs | 210/493.2 |
| 2,936,855 | 5/1960 | Allen et al. | 55/521 |
| 3,112,184 | 11/1963 | Hollenbach | 210/493.4 |
| 3,174,625 | 3/1965 | Briggs | 210/493.1 |
| 3,198,336 | 8/1965 | Hyslop | 210/457 |
| 3,392,843 | 7/1968 | Mumby | 210/457 |
| 3,531,920 | 10/1970 | Hart | 55/497 |
| 3,950,256 | 4/1976 | Read | 210/493.5 |
| 4,268,290 | 5/1981 | Barrington | 210/493.1 |
| 4,452,619 | 6/1984 | Wright et al. | 55/521 |

FOREIGN PATENT DOCUMENTS

| | | | |
|---|---|---|---|
| 2729207 | 1/1978 | Fed. Rep. of Germany | 210/493.2 |
| 637687 | 7/1978 | U.S.S.R. | 210/493.2 |

Primary Examiner—Richard V. Fisher
Assistant Examiner—Wanda L. Millard
Attorney, Agent, or Firm—Merchant, Gould, Smith, Edell, Welter & Schmidt

[57] ABSTRACT

A spacing and scoring tool for creating high density pleated filter media, and the media therefor is disclosed herein. A blade (14) having curvilinear portions (22, 22a) and linear portions (21, 21a) create an island pattern when scored into flat or corrugated media (16). The island are preferably located centrally upon the corrugation peaks (18) either at every peak or periodically. The resulting pattern when foled produces filter media with automatic pleat spacing and this structure can be used at very high pleat spacings beyond 10 pleats per inch. The blade (14) is solid on its contact face at the curvilinear portions for preventing island collapse when the media is folded.

7 Claims, 10 Drawing Figures

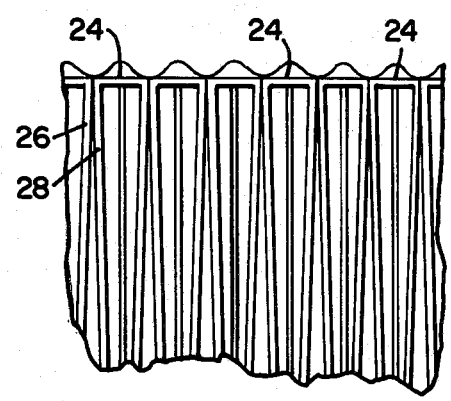
FIG. 6
FIG. 5
FIG. 4
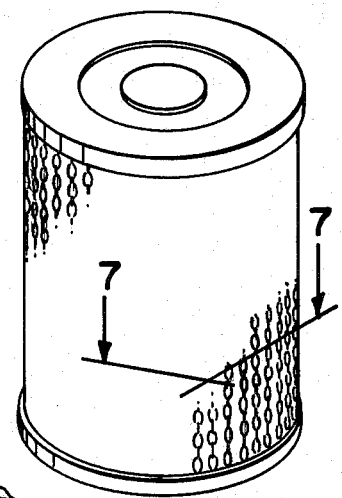
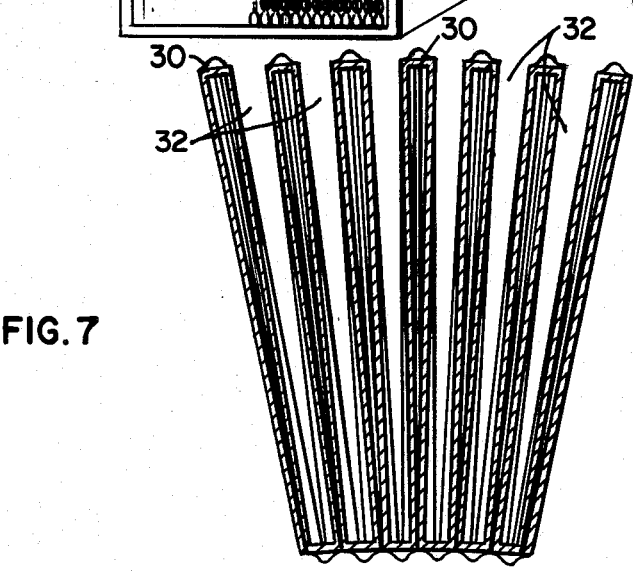
FIG. 7

HIGH DENSITY PLEAT SPACING AND SCORING TOOL AND FILTER MADE THEREWITH

TECHNICAL FIELD

The present invention relates to pleated filter elements, more particularly to the scoring of the filter media to achieve predetermined spacing between adjacent pleats in the filter element using a spacing and scoring tool.

BACKGROUND

In pleated media filter elements, the performance of the filter will be enhanced or diminished by the ability of the fluid being filtered to pass freely and completely through the media. If open flow paths are maintained between the pleats, the filter normally will operate at its optimum. If, on the other hand, the flow paths through the filter are somehow obstructed or reduced, e.g. when pleats bunch together, the filtering capacity of the media will be diminished. Thus, maintaining a certain spacing between successive pleats in an assembled pleated filter element is extremely important to the overall performance of that element.

Several methods for achieving equal pleat spacing have been devised by others and are known in the art. These include the use of figure eight shaped pleats, the bonding of the pleat tips to the filter liner by using a spiral bead of adhesive and the use of string, paper or adhesive as a spacer between individual pleats. Also, various methods for corrugating or creating bumps and dimples upon the pleat surface have also been employed in attempts to obtain reliable, self-spacing filter element pleats.

There are disadvantages, however, to all of the above prior art methods. The figure eight pleat arrangement relies upon a predetermined pleat density to obtain optimum performance. Although the concept of a figure eight pleat was originally intended to achieve self-spacing pleats, such a result has not been consistently and reliably obtained from this method. Figure eight pleat configurations are difficult to obtain at high pleating rates and the effectiveness of the figure eight pleat is largely negated under conditions of elevated temperature and humidity. The methods of bonding pleat tips to a liner or placing a spacer element between the pleats each require an additional step in the manufacturing process and involve a material "add on" which thus increases the cost of the construction of the filter. Forming dimples or bumps which project outwardly from the surface of the pleat would initially space the pleats apart, however during the process of forming such projections the filter media itself is often damaged thereby reducing the effective area available for filtration.

In U.S. Pat. No. 4,452,619 (of which I am a co-inventor), we invented a mechanism for establishing pleat spacing which was particularly well suited to elements with low pleat density of roughly less than 12 pleats per inch (5 pleats per cm). In that invention, a hollow blade is employed which scores a pattern having an unscored island bounded by semicircular or eliptical score lines. While this system achieves excellent results at low densities, the nature of the scoring blade does not permit its effective use at higher densities.

The present invention discloses a unique pleat spacing tool and method for using same which produces the desirable results obtained for lower densities as explained in U.S. Pat. No. 4,452,619 but allows for much higher density filter packs.

The recurring disadvantages of the prior art are overcome in the present invention in that the method of practicing the invention requires a minimum of manufacturing steps and there is no need for additional structural components to achieve reliable and dependable spacing between the pleats contained in the filter element.

SUMMARY OF THE INVENTION

The present invention is a pleat spacing and scoring tool having a longitudinal blade with a plurality of solid curvilinear portions for achieving and maintaining predetermined spatial relationships between adjacent pleats in a filter element. The invention includes a unique pattern which is scored upon the tip portions of the pleats prior to pleating the media. Upon pleating the scored media, the scored pattern causes the pleat tips to be formed in such a manner that the resulting configuration physically spaces that particular pleat from adjacent pleats on either side of it. The pattern, scored upon the general region of the pleat tip, creates an integral structural expansion or projection in the filter element which allows the pleat to mechanically space itself a given distance from adjacent pleats.

The present invention affords a new pleat spacing mechanism for pleated filter media which becomes an integral part of the media without damage to or loss of any significant effective filtering area. Furthermore, the invention is accomplished during the scoring and pleating steps of the manufacturing process and requires only a modification in the scoring blades which are already commonly used in pleating machines.

According to another aspect of the invention, there is disclosed a filter element employing corrugated filter media with peaks and valleys. A pattern is scored into the media orthogonal to the peaks, the pattern including solid curvilinear portions connected by linear sections with the centers of the portions being aligned with the corrugation peaks.

These and various other advantages and features of the invention's novelty are pointed out in the claims. However, for a more complete understanding of the invention and its advantages, reference should be made to the drawing forming a part hereof and to the accompanying description in which there is illustrated and described a preferred embodiment and alternative embodiments of the invention.

BRIEF DESCRIPTION OF THE DRAWINGS

In the drawing, wherein like numerals refer to like elements throughout the several views.

FIG. 4 is a representative view of a filter pack made in accordance with the present invention in a rectangular shape;

FIG. 5 is a view like FIG. 4 except showing a cylindrical filter;

FIG. 6 is a view taken along line 6—6 of FIG. 4;

FIG. 7 is a view taken along line 7—7 of FIG. 5;

DETAILED DESCRIPTION OF THE INVENTION

Figure 1:
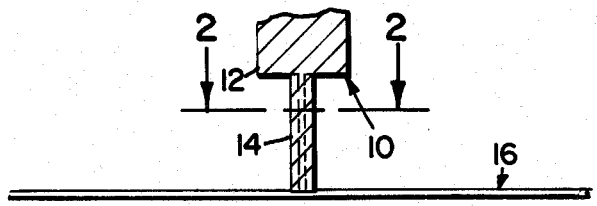
FIG. 1 is a cross-sectional view of the scoring tool according to the present invention as applied onto filter media.

In the drawings, wherein like numerals are used throughout the several views to indicate the same or substantially similar elements of the invention, there is shown in FIG. 1 a scoring tool 10 having a main body 12 to be held within a scoring machine and a knife blade 14. As shown in the figure, blade 14 and flat filter media 16.

Scoring blade 14 provides the fold lines for the media 16 and simultaneously creates curvilinear "islands" or flats along the scoring lines, as will be explained hereinafter, which automatically maintain the pleats in a spaced apart relationship. The system can be applied to both flat and corrugated media, the maximum benefit being obtained with the latter. An explanation of scoring media in general can be found in my U.S. Pat. No. 4,452,619, which is incorporated herein by reference.

Figure 2:
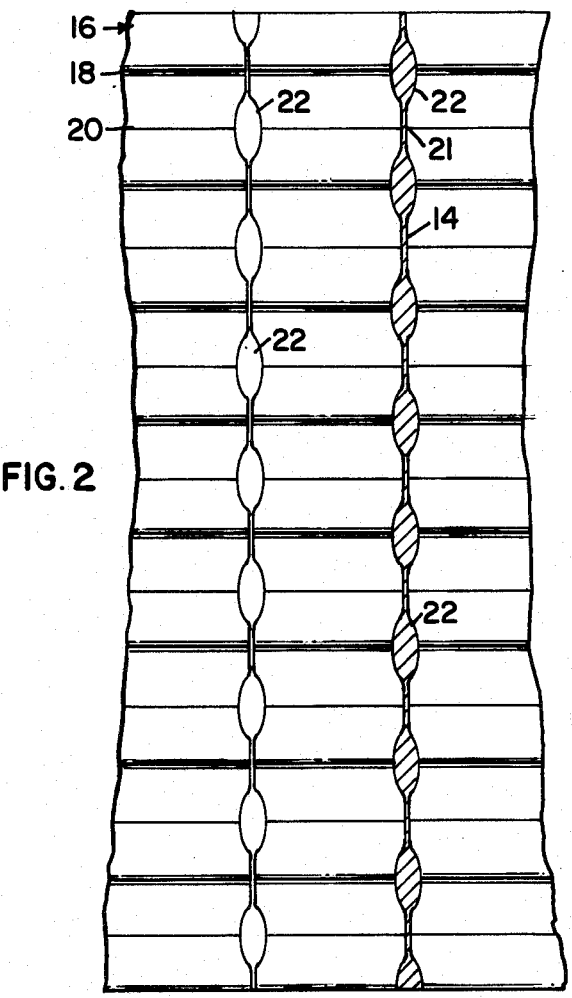
FIG. 2 is a view taken along lines 2—2 showing a preferred scoring pattern in accordance with the present invention.
Figure 10:
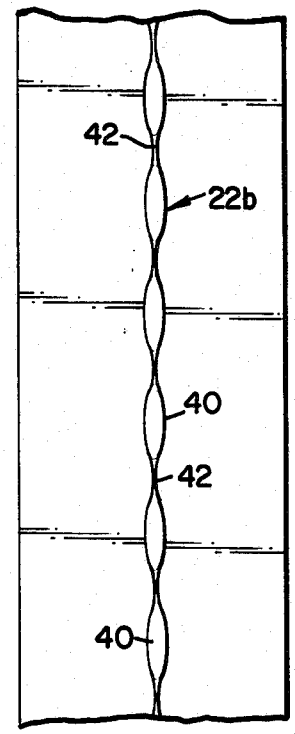
FIG. 10 is a view like FIG. 2 except that the scoring tool lacks the linear portions between curvilinear portions.

As seen in FIG. 2, the media 16 here is corrugated which has periodic peaks 18 and valleys 20. Applied across the peaks and valleys is knife blade 14, preferably in an orthogonal orientation. The blade includes a plurality of curvilinear portions or flats 22 connected by straight portions 21 which extend from the curvilinear portions 22. Alternatively, the straight portions can be short or eliminated to produce undulated curvilinear portions throughout as shown in FIG. 10 with curvilinear portions 22b essentially including peaks 40 and valleys 42 connected together in a continuous flowing curve. Curvilinear portions 22 are solid across their contact surface which impinges upon the filter media. It is necessary to make the contact surface solid and preferably planar in order to achieve pleat spacing where pleat densities are greater than 10 pleats per inch. (Pleat density being equal to one half the number of score lines per inch, cm, etc.) If the blade were to have a hollow contact surface as in the case of my prior U.S. Pat. No. 4,452,619, the media will not retain its desired spacing effect since, when folded on the peaks and valleys, the folds will simply cut across the center of the curvilinear portions. It is also very difficult to make such blades at high pleat densities.

In FIG. 2, a preferred construction of blade 14 includes curvilinear portions having a central point or axis in line with every corrugation peak. Blade 14 provides spacing for one side of the media by creating curvilinear islands 22 or flats at the corrugation peaks, while blade 14 being offset so as to create islands 22 or flats at the corrugation valleys (as seen from the same side of the media). It is not necessary to use this blade for both valleys and peaks of the corrugation if only one series of pleat tips (inside or outside tips) need have this pleat spacing. It is also possible to use a blade having different island diameters or island spacing in the place of blade 14 to create a different pleat spacing on one series of pleat tips on one side of the filter and another spacing on the other side. This may be desirable in the case of cylindrical filters where the inner diameter is smaller than the outer and larger pleat spacing can be used on the outer diameter.

As shown in the Figures, the blade 14 scores a pattern in the filter media 16 with the pattern including a pleat fold line extending generally perpendicular to the peaks 18 and valleys 20. The pattern also includes the plurality of flats 22. Each of the flats 22 has a first dimensions perpendicular to the fold line and a second dimension parallel to the fold line. The first dimension is greater than the thickness of the fold line and the second dimension is less than the distance between valleys. The flat 22 is disposed on a peak. Also, a second pattern is scored on the media 16 with flats 22 disposed on valleys.

Figure 3:
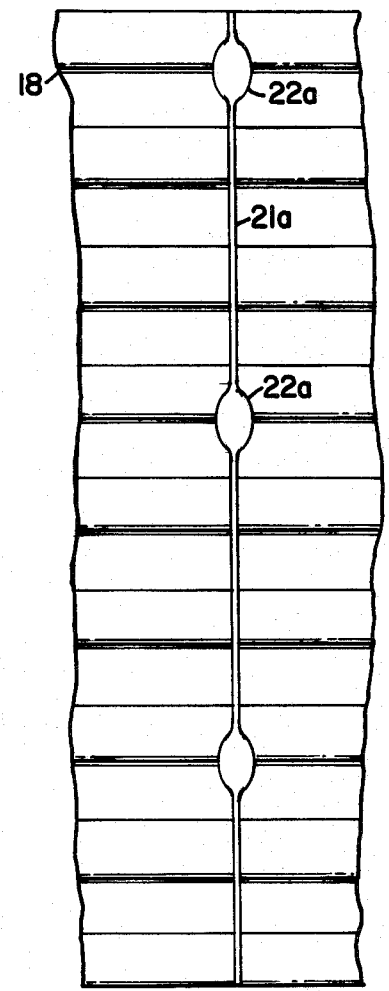
FIG. 3 is a view like FIG. 2 however showing an alternative preferred embodiment of the scoring tool and media.

It is also possible to have fewer curvilinear portions along the blade such as 22a shown in FIG. 3. These portions are still connected by linear segments 21a and their centers are preferably located on corrugation peaks 18 but their spacing is less frequent than every corrugation peak.

FIG. 3 also illustrates an alternate preferred embodiment where the curvilinear portions are generally circular as opposed to oval shaped in FIG. 2. To some extent, the shape is dictated by the corrugation peak spacing.

FIGS. 4 and 5 illustrate how the present invention can be applied to both rectangular and cylindrical filters and it can be understood that other shapes are likewise possible.

FIGS. 6 and 7 illustrate in cross-section the pleat spacing effect of the present invention. In FIG. 6, islands 24 are created at the pleat tips (outer folds at the scoring lines) causing them to broaden. FIG. 6 is a view taken at the broadest point and it shows the sidewalls 26 and 28 of the pleats in contact with adjacent walls. If this view were taken at another point in the media, such as that shown in FIG. 7 for the cylindrical filter, the effect of the islands would be apparent in the form of evenly spaced pleats 30 having spaces 32 therebetween.

Figure 8:
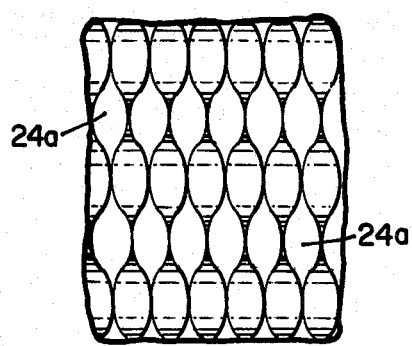
FIG. 8 is a close-up fragmentary view of an embodiment of the present invention applied on flat pleated filter paper.
Figure 9:
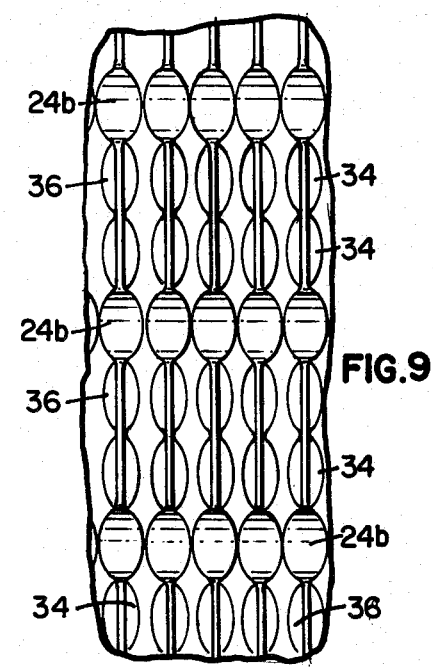
FIG. 9 is a view like FIG. 8 except that the filter media is corrugated and that the scoring tool is like that shown in FIG. 3.

FIG. 8 and 9 show close-up fragmentary views of the media after being scored by the blades in FIGS. 2 and 3 respectively. In FIG. 8, the scoring is made on flat filter media (scored but not corrugated) so that islands 24a are in contact with their adjacent counterpart in the next pleat over and otherwise the material is spaced apart.

FIG. 9 is similar to FIG. 8 but corrugated as well. The corrugations being illustrated by expanded portions 34 which are made of back-to-back peaks of corrugated sections occurring when the media is folded. In this case, every third corrugation is "expanded" by the scoring tool of this invention and islands 24b are created. The advantage of using corrugated paper is to provide more media within the same space as required for flat media and thus additional loading. It can be seen that the present invention makes the use of corrugated media much more feasible since the corrugations would normally be touching but, as seen in FIG. 9 at spaces 36, the corrugations do not touch except at the islands 24b. In normal pleated corrugated configurations, large amounts of filter media are lost due to contact surfaces.

It is desirable to have the islands in alignment with the corrugation peaks as shown to obtain maximum effect however it is not strictly required if degradation in performance is acceptable.

Thus, while the present invention as disclosed herein is represented by several preferred embodiments, it is to be understood that such embodiments are representative and not inclusive. Other embodiments of the invention are possible which are within the scope of the claims which follow.

I claim:

1. A pleated filter assembly comprising:
   a corrugated filter media having longitudinally extending corrugations cooperating to define a plurality of parallel alternating peaks and valleys spaced apart by a predetermined spacing;
   a pattern scored into said media with said pattern including a pleat fold line extending normal to said peaks and valleys;
   said pattern further including a plurality of flats disposed along said pleat fold line with said flats having a first dimension normal to said line and greater than a thickness of said line;
   said flats disposed along said line with each of said flats disposed upon a peak of a corrugation of said filter media; and
   each of said flats having a second dimension normal to said corrugations and less than a distance between valleys on opposite sides of a corrugation peak on which said flat is disposed.

2. A pleated filter assembly according to claim 1 comprising:
   a second pattern scored into said media including a second pleat fold line extending normal to said peaks and valleys;
   said second pattern including a second plurality of flats disposed along said second pleat fold line with said flats of said second plurality having first dimensions normal to said line and greater than a thickness of said line;
   said flats disposed along said second line with each of said flats of said second plurality disposed upon a valley of a corrugation of said filter media.

3. A pleated filter assembly according to claim 2 wherein said flats of said second plurality have a second dimension normal to said corrugations and less than a distance between peaks on opposite sides of a corrugation peak on which said flat of said second plurality is disposed.

4. A pleated filter assembly according to claim 1 wherein successive flats are disposed on peaks of successive corrugations.

5. A pleated filter assembly according to claim 1 wherein said flats are oval in shape and have a center disposed on peaks of said corrugations.

6. A pleated filter assembly according to claim 1 wherein said flats are circular in shape and have a center disposed on peaks of said corrugations.

7. A pleated filter assembly according to claim 1 wherein said filter media is provided with a plurality of said patterns to present a plurality of opposing pleat tips with a plurality of abutting flats at said tips.

* * * * *